US012608348B2

(12) United States Patent
Singh et al.

(10) Patent No.: US 12,608,348 B2
(45) Date of Patent: Apr. 21, 2026

(54) SCHEMA MANAGEMENT FOR A FEDERATED GRAPH WITH AT LEAST THREE LAYERS

(71) Applicant: Capital One Services, LLC, McLean, VA (US)

(72) Inventors: Gaurav Singh, Glen Allen, VA (US); Ashish Prasad Gupta, Richmond, VA (US); Meenakshi Panda, Richmond, VA (US); Vikash Tiwari, Glen Allen, VA (US); Sergio Machado, Glen Allen, VA (US); Pankaj Singh, Glen Allen, VA (US); Sheel Khanna, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/794,549

(22) Filed: Aug. 5, 2024

(65) Prior Publication Data

US 2026/0037485 A1     Feb. 5, 2026

(51) Int. Cl.
     *G06F 16/00* (2019.01)
     *G06F 16/21* (2019.01)
     *G06F 16/901* (2019.01)
(52) U.S. Cl.
     CPC ........ *G06F 16/212* (2019.01); *G06F 16/9024* (2019.01)
(58) Field of Classification Search
     CPC ........................... G06F 16/212; G06F 16/9024
     See application file for complete search history.

(56) References Cited

U.S. PATENT DOCUMENTS

| | | | | |
|---|---|---|---|---|
| 11,263,186 | B2* | 3/2022 | Tamjidi | ................. G06F 16/211 |
| 2023/0138971 | A1* | 5/2023 | Krishnan | .............. G06F 16/211 |
| | | | | 707/797 |
| 2023/0359667 | A1* | 11/2023 | Zionts | ................. G06F 16/9024 |
| 2024/0111766 | A1* | 4/2024 | Newman | ............. G06F 16/9024 |
| 2024/0111767 | A1* | 4/2024 | Walraven | .............. G06F 16/212 |
| 2024/0143590 | A1* | 5/2024 | Karlberg | ........... G06F 16/24545 |

OTHER PUBLICATIONS

"Introduction to Apollo Federation", retrieved from the internet Aug. 5, 2024, 6 pages, https://www.apollographql.com/docs/federation/.

* cited by examiner

*Primary Examiner* — Alexander Khong
(74) *Attorney, Agent, or Firm* — Harrity & Harrity, LLP

(57) ABSTRACT

Some implementations described herein relate to a system for schema management of a federated graph. The system may be configured to obtain unit information. The system may be configured to generate, based on the unit information, a unit schema. The system may be configured to identify, based on generating the unit schema, a particular subgraph schema, of a plurality of subgraph schemas, that is to include the unit schema. The system may be configured to cause the particular subgraph schema to include the unit schema. The system may be configured to cause, based on causing the particular subgraph schema to include the unit schema, a supergraph schema to include the particular subgraph schema.

20 Claims, 12 Drawing Sheets

100

100

108
Particular subgraph schema

Second
Data
Source

Particular Subgraph
Schema

Schema
Management
System

106
Identify a particular
subgraph schema

100

110
Determine that the unit schema is approved to be included in the particular subgraph schema 112
Cause the particular subgraph schema to include the unit schema Schema Management System Particular Subgraph Schema Unit Schema Unit Schema

100

116
Supergraph schema

Third
Data
Source

114
Identify a
supergraph schema

Schema
Management
System

Supergraph
Schema

Obtain unit information

Generate a unit schema

Identify a particular subgraph schema, of a plurality of subgraph schemas, that is to include the unit schema Cause the particular subgraph schema to include the unit schema Cause a supergraph schema to include the particular subgraph schema

410

420

430

440

450

400

SCHEMA MANAGEMENT FOR A FEDERATED GRAPH WITH AT LEAST THREE LAYERS

BACKGROUND

A federated graph is an architectural approach that involves integrating several subgraph schemas into a unified supergraph schema. A client device can interact with multiple application programming interfaces (APIs) of the subgraph schemas by communicating with a single network device that has been provisioned with the supergraph schema.

SUMMARY

Some implementations described herein relate to a system for schema management of a federated graph. The system may include one or more memories and one or more processors communicatively coupled to the one or more memories. The one or more processors may be configured to obtain unit information. The one or more processors may be configured to generate, based on the unit information, a unit schema. The one or more processors may be configured to identify, based on generating the unit schema, a particular subgraph schema, of a plurality of subgraph schemas, that is to include the unit schema. The one or more processors may be configured to cause the particular subgraph schema to include the unit schema. The one or more processors may be configured to cause, based on causing the particular subgraph schema to include the unit schema, a supergraph schema to include the particular subgraph schema.

Some implementations described herein relate to a non-transitory computer-readable medium that stores a set of instructions. The set of instructions, when executed by one or more processors of a federated graph, may cause the federated graph to generate, based on unit information, a unit schema. The set of instructions, when executed by one or more processors of the federated graph, may cause the federated graph to cause a particular subgraph schema, of a plurality of subgraph schemas, to include the unit schema. The set of instructions, when executed by one or more processors of the federated graph, may cause the federated graph to cause, based on causing the particular subgraph schema to include the unit schema, a supergraph schema to include the particular subgraph schema. The set of instructions, when executed by one or more processors of the federated graph, may cause the federated graph to provide, based on causing the supergraph schema to include the particular subgraph schema, the supergraph schema to at least one network device.

Some implementations described herein relate to a method. The method may include obtaining, by a system for schema management of a federated graph, unit information. The method may include generating, by the system, a unit schema. The method may include causing, by the system, a particular subgraph schema, of a plurality of subgraph schemas, to include the unit schema. The method may include causing, by the system, a supergraph schema to include the particular subgraph schema.

DETAILED DESCRIPTION

Figure 1A:
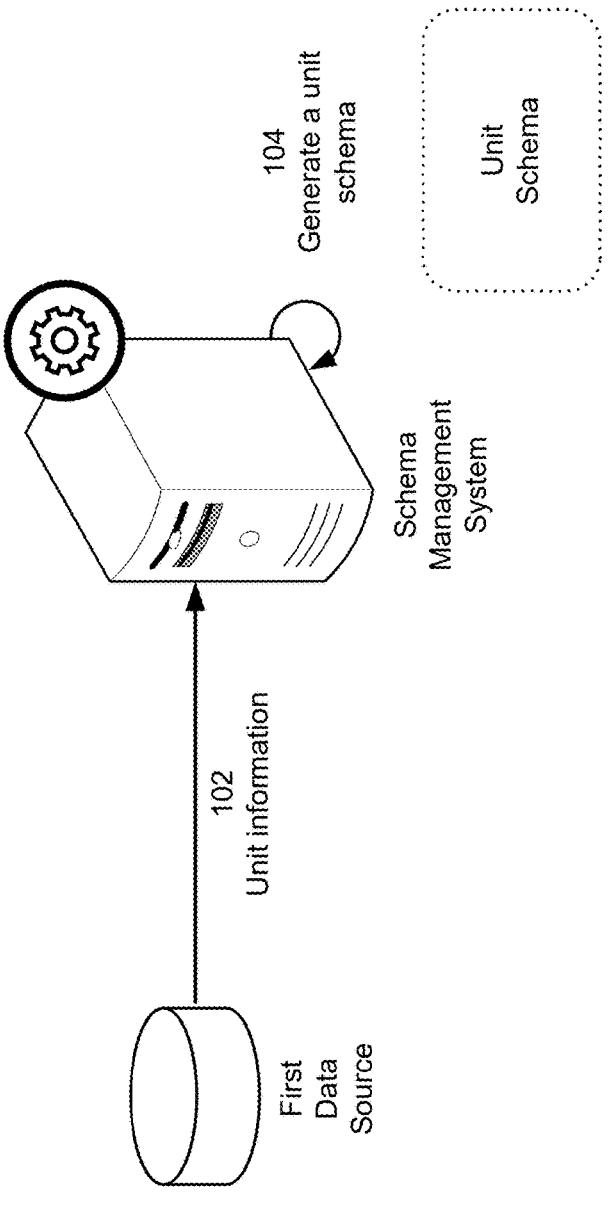
FIGS. 1A-1I are diagrams of an example implementation associated with schema management for a federated graph with at least three layers, in accordance with some embodiments of the present disclosure.

The following detailed description of example implementations refers to the accompanying drawings. The same reference numbers in different drawings may identify the same or similar elements.

Currently, a federated graph (e.g., as supported using the GraphQL language protocol) includes two layers. A first layer is associated with a supergraph schema and a second layer is associated with a plurality of subgraph schemas. Each subgraph schema is merged into the supergraph schema, such that APIs of the subgraph schemas appear to be part of a single, unified supergraph schema. This enables API actions to be handled by a single network device that is provisioned with the supergraph schema. Further, it allows for independent development of subgraph schemas, while providing a seemingly cohesive data source (e.g., the supergraph schema) for client devices communicating with the network device.

While a two-layer federated graph provides benefits for organizations with relatively simple, or flat, data hierarchy schemes, it is not as useful for organizations with more complex data hierarchy schemes. For example, in such an organization, multiple teams may develop different sets of APIs that are to be included in a single subgraph schema. This can make development and management of the subgraph schema difficult, and can lead to errors or other issues that require use of computing resources (e.g., processing resources, memory resources, communication resources, and/or power resources, among other examples) to identify, address, and resolve (e.g., to ensure an integrity of the subgraph schema). For example, sets of APIs developed by different teams can use similar API action structures, which can complicate integration of the sets of APIs into the subgraph schema, and therefore require use of computing resources to modify the API action structures and address issues associated with integration of the sets of APIs into the subgraph schema.

Some implementations described herein include a schema management system. The schema management system supports federated graphs having at least three levels. For example, the schema management system is able to merge a unit schema (i.e., a sub-subgraph schema that is associated with a third level of the federated graph) with a subgraph schema (that is associated with a second level of the federated graph), and merge the subgraph schema with a supergraph schema (that is associated with a first level of the federated graph). In this way, the schema management system enables incorporation (e.g., automatic incorporation, without manual intervention) of many different unit schemas into a single subgraph schema.

Accordingly, for organizations with more complex data hierarchy schemes, multiple teams are able to independently develop sets of APIs respectively associated with different unit schemas (e.g., without fear of creating overlapping API action structures). The schema management system is able to automatically merge the unit schemas with corresponding subgraph schemas, which eases development and management of the subgraph schemas. Further, because the schema management system is configured to automatically and accurately merge unit schemas with subgraph schemas, a likelihood of errors or other issues associated with forming the subgraph schemas is reduced. This therefore conserves computing resources (e.g., processing resources, memory resources, communication resources, and/or power resources, among other examples) that would otherwise be used to resolve such errors or other issues.

Further, in some implementations, the schema management system provides governance controls (e.g., approval mechanisms and/or validation mechanisms) for deployment of the supergraph schema to network devices associated with different environments. This enables the supergraph schema to be thoroughly tested and verified before being included in a particular environment (e.g., a review environment, a staging environment, or a production environment). In this way, the schema management system reduces a likelihood that the supergraph schema, when deployed to a production environment, causes issues that require the use of computing resources to identify, address, and/or resolve.

While examples related to the schema management system described herein are related to a three-layer federated graph, other examples included federated graphs with any number of levels (e.g., with at least three layers). Accordingly, operations described herein are applicable to implementations that require merging a sub-subgraph schema (e.g., associated with a level X) with a particular subgraph schema (e.g., associated with a level X–1), and merging the particular subgraph schema with a supergraph schema (e.g., associated with a level X–2). In this way, the schema management system enables enhanced modularity associated with sets of APIs and improved scalability for complex data hierarchy schemes.

FIGS. 1A-1I are diagrams of an example implementation 100 associated with schema management for a federated graph with at least three layers. As shown in FIGS. 1A-1I, example implementation 100 includes a schema management system, a plurality of data sources (shown as a first data source, a second data source, and a third data source), and/or a plurality of network devices (shown as at least one first network device, at least one second network device, and at least one third network device). These devices are described in more detail below in connection with FIG. 2 and FIG. 3.

As shown in FIG. 1A, and by reference number 102, the schema management system may obtain unit information. For example, the first data source (e.g., that stores the unit information) may send (e.g., push) the unit information to the schema management system via a connection between the first data source and the schema management system, and the schema management system may thereby receive the unit information from the first data source (e.g., via the connection). As another example, the schema management system may send a request (e.g., via the connection) for the unit information to the first data source; the first data source, in response, may send the unit information to the schema management system (e.g., via the connection); and the schema management system may thereby receive the unit information from the first data source (e.g., via the connection).

The unit information may include data associated with a particular product, a line of business, and/or other similar information associated with a unit of an organization. The unit information may include, for example, data associated with users of a product, data associated with authorization of the users, data associated with one or more accounts of the users, data associated with features of the product, and/or other types of information. In this case, the unit information may be referred to as data product information.

As shown by reference number 104, the schema management system may generate a unit schema. The schema management system may generate the unit schema based on the unit information. For example, the schema management system may process the unit information (e.g., using an information-to-schema processing technique) to generate the unit schema.

The unit schema may include one or more APIs (e.g., associated with accessing, updating, and/or retrieving the unit information). When the unit information is data product information, the unit schema may be referred to as a data product schema. In some implementations, the unit schema may be formatted to conform to a federated graph language protocol. For example, the unit schema may be a GraphQL schema that conforms to the GraphQL language protocol. As described elsewhere herein, the unit schema may be associated with a third layer of a federated graph (and thus, the unit schema may also be referred to as a sub-subgraph schema).

Figure 1B:
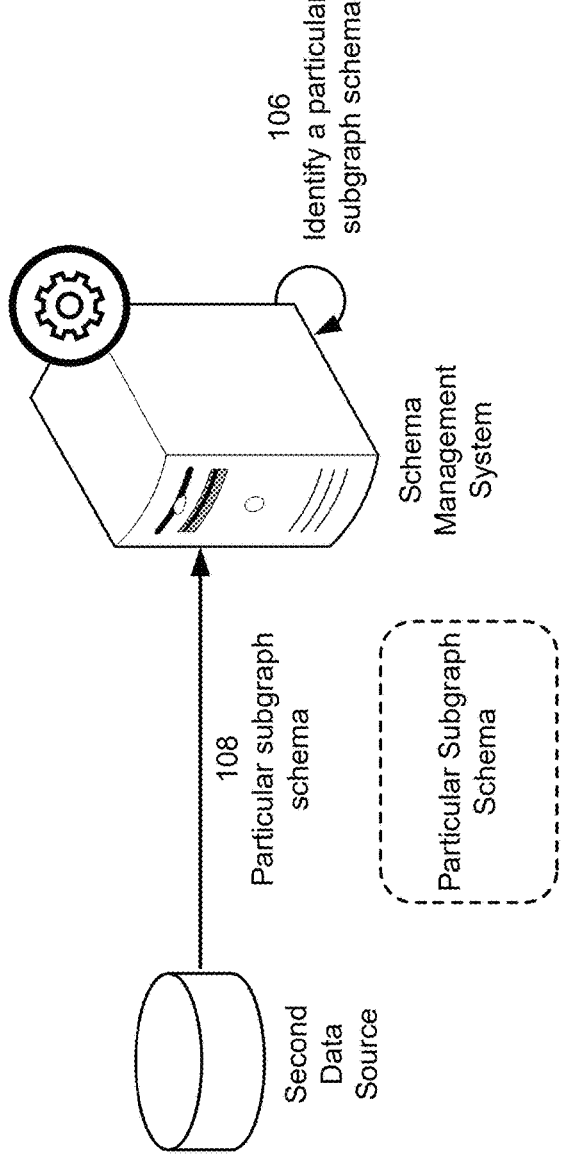

As shown in FIG. 1B, and by reference number 106, the schema management system may identify a particular subgraph schema, of a plurality of subgraph schemas, that is to include the unit schema. For example, the schema management system may identify one or more parameters associated with the unit schema and may thereby identify, based on the one or more parameters, the particular subgraph schema. That is, the schema management system may identify, based on the one or more parameters, the particular subgraph schema as a most relevant subgraph schema, of the plurality of subgraph schemas, to include the unit schema. For example, when the unit schema is associated with authorization of users of a product, the schema management system may identify a subgraph schema associated with user management as the particular subgraph schema.

The particular subgraph schema (as well as each of the other subgraph schemas of the plurality of subgraph schemas) may include one or more APIs (e.g., associated with accessing, updating, and/or retrieving information associated with the particular subgraph schema). The particular subgraph schema (as well as each of the other subgraph schemas of the plurality of subgraph schemas) may be formatted to conform to a federated graph language protocol. For example, the particular subgraph schema may be a GraphQL schema that conforms to the GraphQL language protocol. As described elsewhere herein, the particular subgraph schema (as well as each of the other subgraph schemas of the plurality of subgraph schemas) may be associated with a second layer of the federated graph.

As shown by reference number 108, the schema management system may obtain the particular subgraph schema (e.g., based on identifying the particular subgraph schema). For example, the schema management system may send a request for the particular subgraph schema to a second data source (e.g., that stores the particular subgraph schema and, optionally, one or more other subgraph schemas of the plurality of subgraph schemas) via a connection between the second data source and the schema management system; the second data source, in response, may send the particular subgraph schema to the schema management system (e.g., via the connection); and the schema management system may thereby receive the particular subgraph schema from the second data source (e.g., via the connection).

Figure 1C:
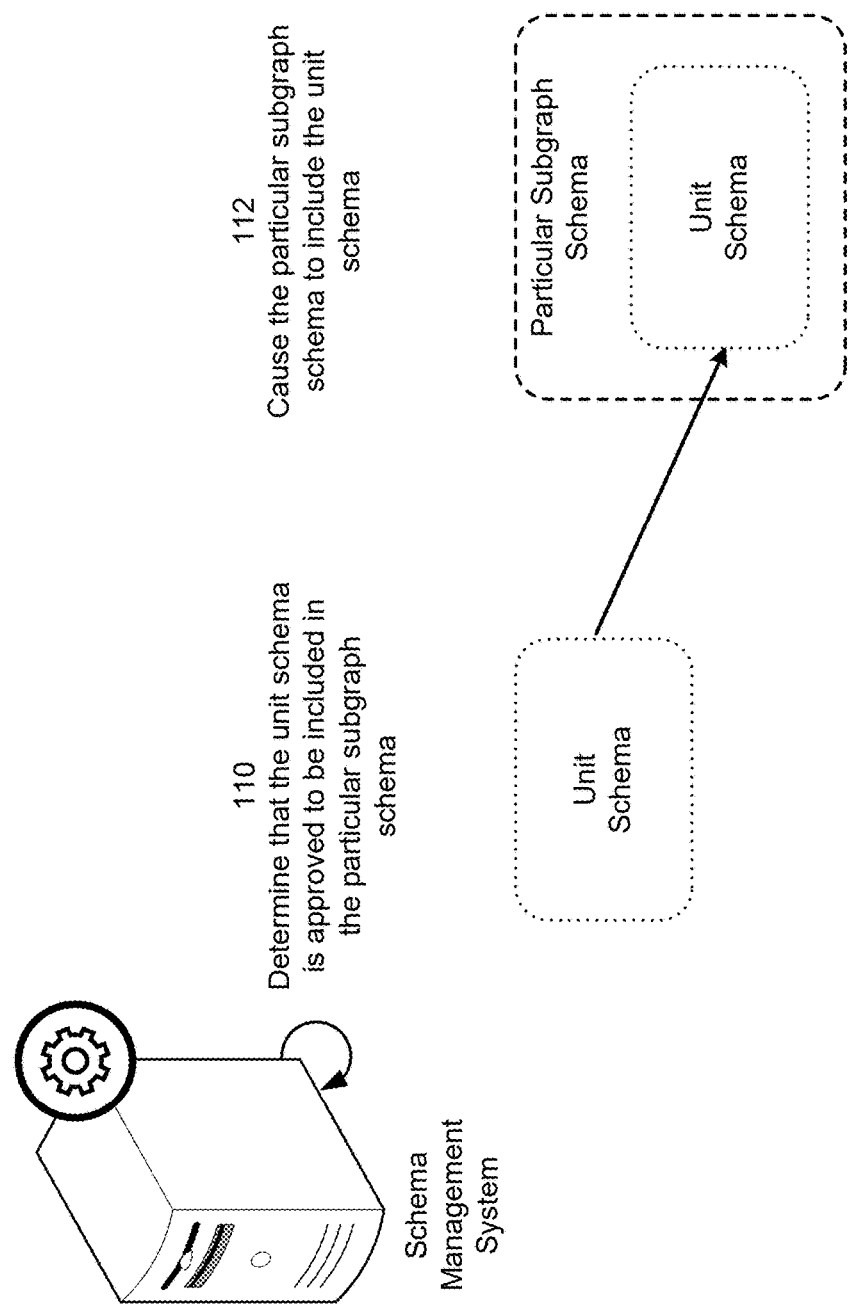

As shown in FIG. 1C, and by reference number 110, the schema management system may determine (e.g., using at least one approval technique) that the unit schema is approved to be included in the particular subgraph schema. For example, the schema management system may provide information associated with the unit schema and/or the particular subgraph schema to another device (e.g., a client device of a user associated with managing the unit schema and/or the particular subgraph schema), may receive an approval response from the device, and therefore may determine that the unit schema is approved to be included in the particular subgraph schema. Additionally, or alternatively, the schema management system may process the information associated with the unit schema and/or the particular subgraph schema to determine that the unit schema is approved to be included in the particular subgraph schema.

As shown by reference number 112, the schema management system may cause the particular subgraph schema to include the unit schema (e.g., based on determining that the unit schema is approved to be included in the particular subgraph schema). For example, the schema management system may merge (e.g., using a federated graph merging technique), based on determining that the unit schema is approved to be included in the particular subgraph schema, the unit schema with the particular subgraph schema. In this way, the particular subgraph schema may include one or more APIs of the unit schema. Notably, while FIG. 1C shows the particular subgraph schema including only the unit schema, the particular subgraph schema may also include one or more other unit schemas (e.g., that are included in the particular subgraph schema by the schema management system in a similar manner as that described elsewhere herein) and/or one or more other APIs of the particular subgraph schema (e.g., that are not included in any other unit schema).

Figure 1D:
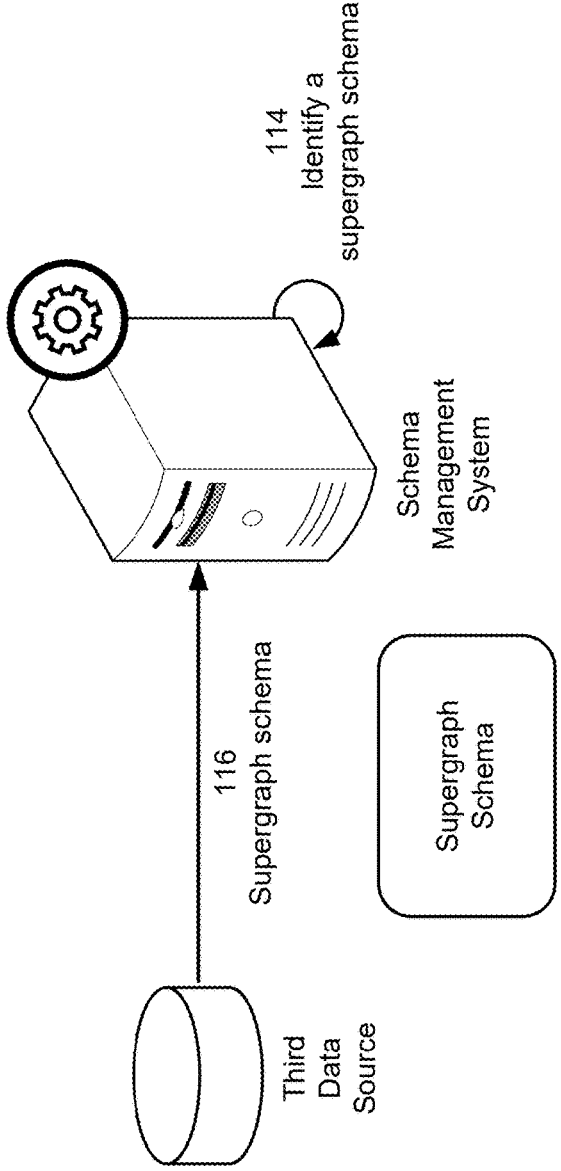

As shown in FIG. 1D, and by reference number 114, the schema management system may identify a supergraph schema that is to include the particular subgraph schema. For example, the schema management system may identify the supergraph schema as the supergraph schema for the plurality of subgraph schemas.

The supergraph schema may include one or more APIs (e.g., associated with accessing, updating, and/or retrieving information associated with the supergraph schema). The supergraph schema may be formatted to conform to a federated graph language protocol. For example, the supergraph schema may be a GraphQL schema that conforms to the GraphQL language protocol. As described elsewhere herein, the supergraph schema may be associated with a first layer of the federated graph (and therefore there may be only one supergraph schema).

As shown by reference number 116, the schema management system may obtain the supergraph schema (e.g., based on identifying the supergraph schema). For example, the schema management system may send a request for the supergraph schema to a third data source (e.g., that stores the supergraph schema) via a connection between the third data source and the schema management system; the third data source, in response, may send the supergraph schema to the schema management system (e.g., via the connection); and the schema management system may thereby receive the supergraph schema from the third data source (e.g., via the connection).

Figure 1E:
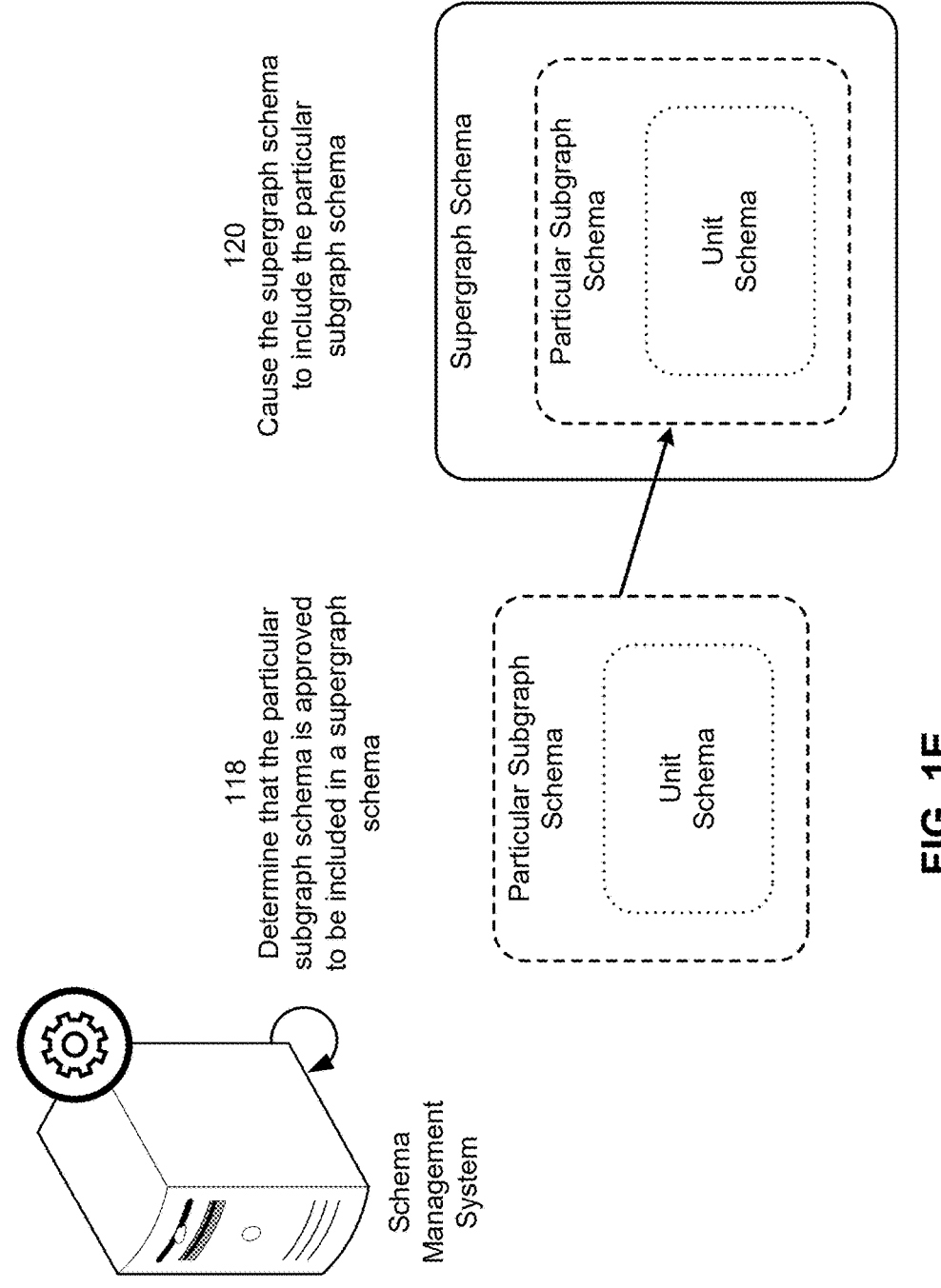

As shown in FIG. 1E, and by reference number 118, the schema management system may determine (e.g., using at least one approval technique) that the particular subgraph schema is approved to be included in the supergraph schema. For example, the schema management system may provide information associated with the particular subgraph schema and/or the supergraph schema to another device (e.g., a client device of a user associated with managing the particular subgraph schema and/or the supergraph schema), may receive an approval response from the device, and therefore may determine that the particular subgraph schema is approved to be included in the supergraph schema. Additionally, or alternatively, the schema management system may process the information associated with the particular subgraph schema and/or the supergraph schema to determine that the particular subgraph schema is approved to be included in the supergraph schema.

As shown by reference number 120, the schema management system may cause the supergraph schema to include the particular subgraph schema (e.g., based on determining that the particular subgraph schema is approved to be included in the supergraph schema). For example, the schema management system may merge (e.g., using a federated graph merging technique), based on determining that the particular subgraph schema is approved to be included in the supergraph schema, the particular subgraph schema with the supergraph schema. In this way, the supergraph schema may include one or more APIs of the particular subgraph schema (e.g., that includes one or more APIs of the unit schema). Notably, while FIG. 1E shows the supergraph schema including only the particular subgraph schema, the supergraph schema may also include one or more other subgraph schemas, of the plurality of subgraph schemas, and/or one or more other APIs of the supergraph schema (e.g., that are not included in any other subgraph schema).

Figure 1F:
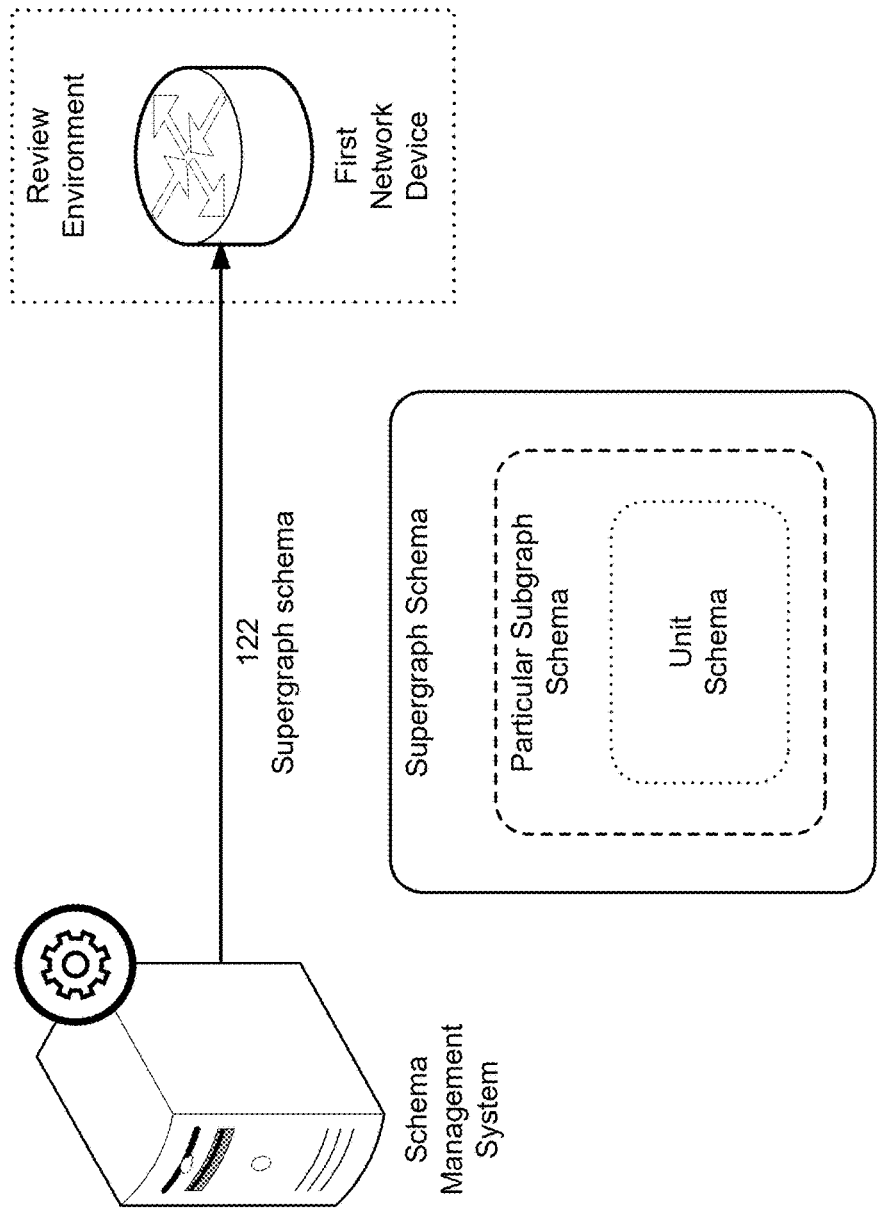

As shown in FIG. 1F, and by reference number 122, the schema management system may provide the supergraph schema to at least one first network device (e.g., based on causing the supergraph schema to include the particular subgraph schema). The at least one first network device may be associated with a review environment. For example, the at least one first network device may be configured to be a "router" for the federated graph, such that the network device serves as a "gateway" or an "entry point" for the supergraph schema in the review environment. The review environment may be internal (e.g., may not be available via a public network, such as the Internet) to an organization associated with the federated graph. Accordingly, other devices associated with the review environment may communicate with the at least one first network device to enable testing of the supergraph schema (and therefore the federated graph) in the review environment.

Figure 1G:
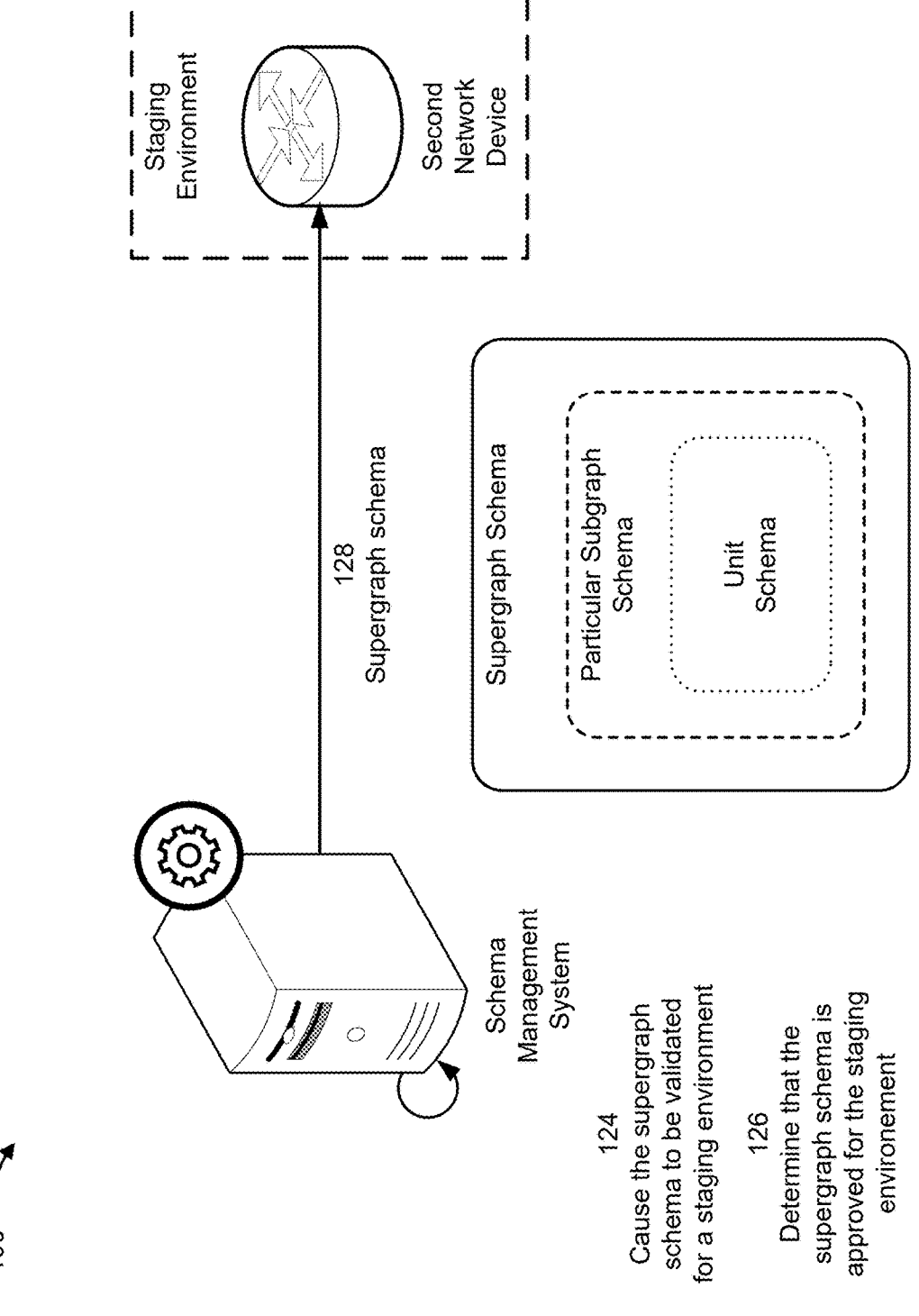

As shown in FIG. 1G, and by reference number 124, the schema management system may cause (e.g., based on causing the supergraph schema to include the particular subgraph schema and/or based on providing the supergraph schema to the at least one first network device associated with the review environment) the supergraph schema to be validated for a staging environment (e.g., to be determined to be compatible with and/or ready to be deployed to the staging environment). For example, the schema management system may provide information associated with the supergraph schema to another device (e.g., a client device of a user associated with managing the review environment), may receive a validation response from the device, and therefore may determine that the supergraph schema is validated for the staging environment. Additionally, or alternatively, the schema management system may process the information associated with the supergraph schema to determine that the supergraph schema is validated for the staging environment.

As shown by reference number 126, the schema management system may determine (e.g., using at least one approval technique) that the supergraph schema is approved for the staging environment (e.g., based on causing the supergraph schema to include the particular subgraph schema, based on providing the supergraph schema to the at least one first network device associated with the review environment, and/or based on causing the supergraph schema to be validated for the staging environment). For example, the schema management system may provide information associated with the supergraph schema to another device (e.g., a client device of a user associated with managing the staging environment), may receive an approval response from the device, and therefore may determine that the supergraph schema is approved for the staging environment. Additionally, or alternatively, the schema management system may process the information with the supergraph schema to determine that the supergraph schema is approved for the staging environment.

As shown by reference number 128, the schema management system may provide the supergraph schema to at least one second network device (e.g., based on causing the supergraph schema to include the particular subgraph schema, based on providing the supergraph schema to the at least one first network device associated with the review environment, based on causing the supergraph schema to be validated for the staging environment, and/or based on determining that the supergraph schema is approved for the staging environment). The at least one second network device may be associated with the staging environment. For example, the at least one second network device may be configured to be a router for the federated graph, such that the at least one second network device serves as a gateway or an entry point for the supergraph schema in the staging environment. The staging environment may be internal (e.g., may not be available via a public network, such as the Internet) to an organization associated with the federated graph, but may include the same, or similar, configurations of a production environment (further described herein). Accordingly, other devices associated with the staging environment may communicate with the at least one second network device to enable testing of the supergraph schema (and therefore the federated graph) in the staging environment.

Figure 1H:
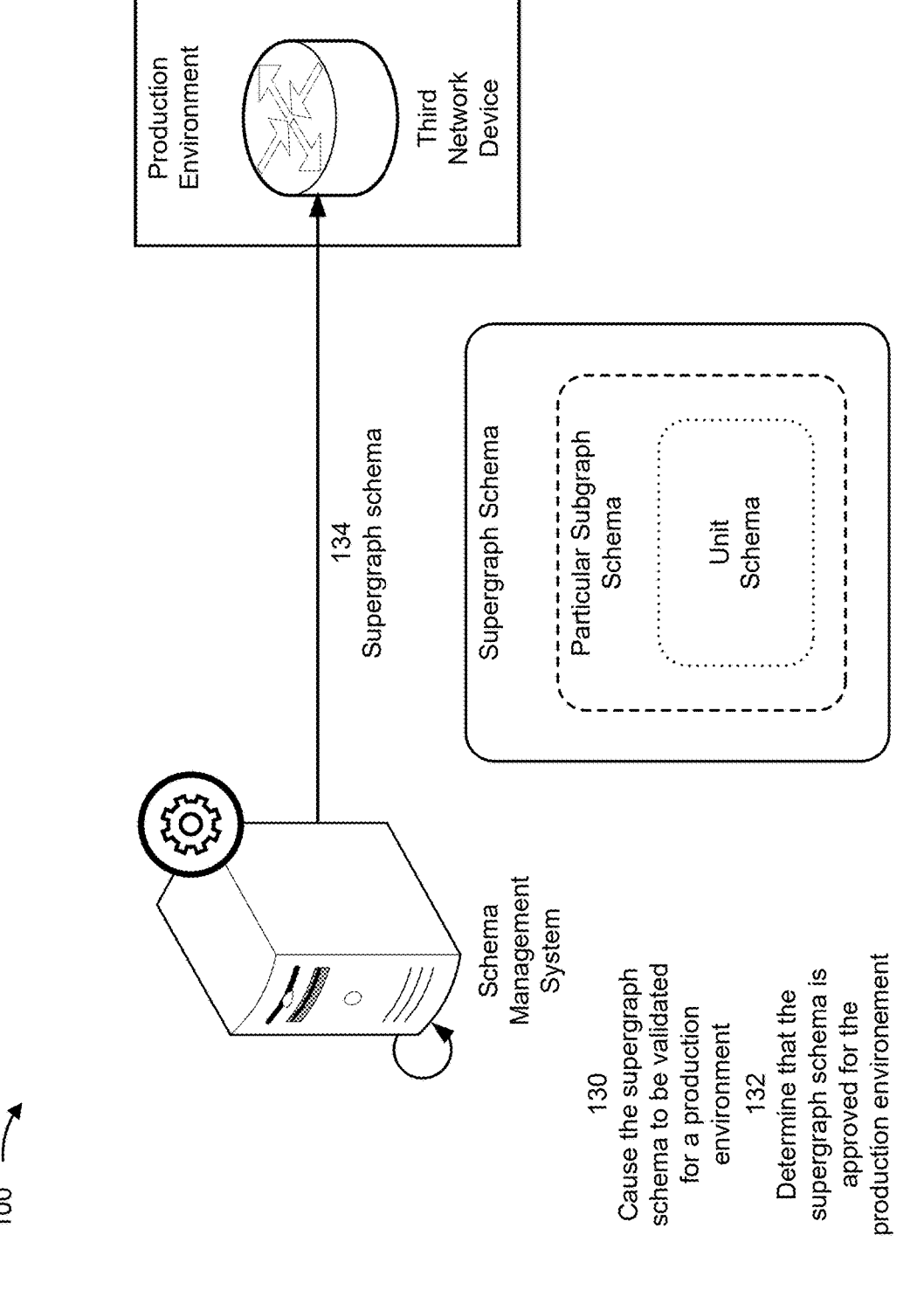

As shown in FIG. 1H, and by reference number 130, the schema management system may cause (e.g., based on causing the supergraph schema to include the particular subgraph schema, based on providing the supergraph schema to the at least one first network device associated with the review environment, and/or based on providing the supergraph schema to the at least one second network device associated with the staging environment) the supergraph schema to be validated for the production environment (e.g., to be determined to be compatible with and/or ready to be deployed to the production environment). For example, the schema management system may provide information associated with the supergraph schema to another device (e.g., a client device of a user associated with managing the staging environment), may receive a validation response from the device, and therefore may determine that the supergraph schema is validated for the production environment. Additionally, or alternatively, the schema management system may process the information associated with the supergraph schema to determine that the supergraph schema is validated for the production environment.

As shown by reference number 132, the schema management system may determine (e.g., using at least one approval technique) that the supergraph schema is approved for the production environment (e.g., based on causing the supergraph schema to include the particular subgraph schema, based on providing the supergraph schema to the at least one first network device associated with the review environment, based on providing the supergraph schema to the at least one second network device associated with the staging environment, and/or based on causing the supergraph schema to be validated for the production environment). For example, the schema management system may provide information associated with the supergraph schema to another device (e.g., a client device of a user associated with managing the production environment), may receive an approval response from the device, and therefore may determine that the supergraph schema is approved for the production environment. Additionally, or alternatively, the schema management system may process the information associated with the supergraph schema to determine that the supergraph schema is approved for the production environment.

As shown by reference number 134, the schema management system may provide the supergraph schema to at least one third network device (e.g., based on causing the supergraph schema to include the particular subgraph schema, based on providing the supergraph schema to the at least one first network device associated with the review environment, based on providing the supergraph schema to the at least one second network device associated with the staging environment, based on causing the supergraph schema to be validated for the production environment, and/or based on determining that the supergraph schema is approved for the production environment). The at least one third network device may be associated with the production environment. For example, the third network device may be configured to be a router for the federated graph, such that the at least one third network device serves as a gateway or an entry point for the supergraph schema in the production environment. The production environment may be an external facing environment (e.g., may be available via a public network, such as the Internet) for an organization associated with the federated graph. Accordingly, other devices (e.g., of clients, customers, or other types of users, of the organization) that are associated with the production environment may communicate with the at least one third network device to enable access and use of the supergraph schema (and therefore the federated graph) in the production environment.

Figure 1I:
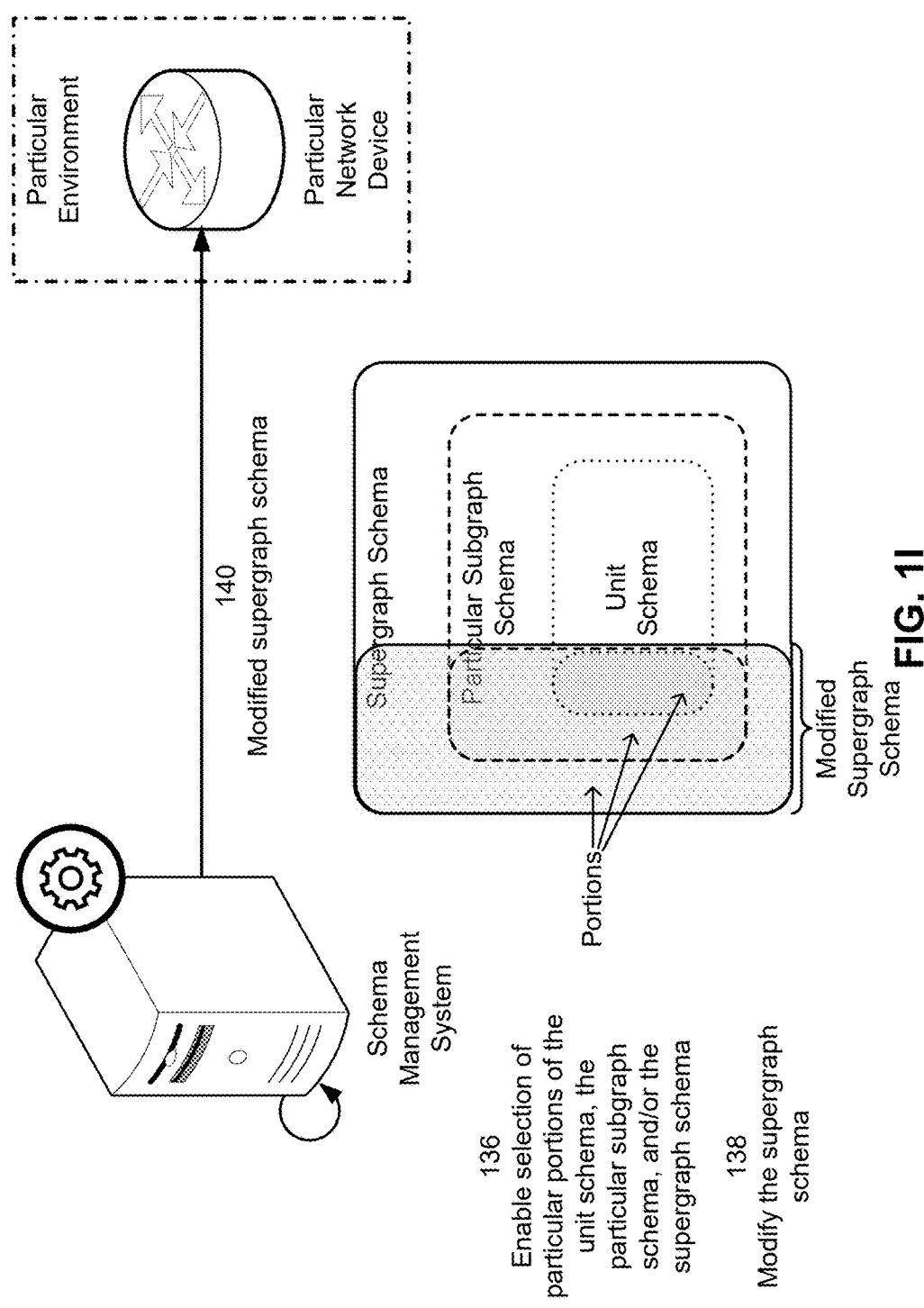

As shown in FIG. 1I, the schema management system may provide one or more additional functionalities in association with providing the supergraph schema to at least one particular network device associated with a particular environment (e.g., to the at least one first network device, the at least one second network device, or the at least one third network device that are associated with the review environment, the staging environment, and the production environment, respectively) as described herein in relation to FIGS. 1F-1H.

In some implementations, as shown by reference number 136, the schema management system may enable selection of particular portions of the unit schema, the particular subgraph schema, and/or the supergraph schema. For example, as shown in FIG. 1I, the schema management system may enable selection of a portion of the supergraph schema that includes one or more particular portions of the particular subgraph schema that include one or more particular portions of the unit schema. The schema management system may enable selection of this selection by providing information associated with the supergraph schema to another device (e.g., a client device of a user associated with managing the particular environment) and may receive selection information associated with the supergraph schema that indicates the portion of the supergraph schema that includes the one or more particular portions of the particular subgraph schema that include the one or more particular portions of the unit schema.

Accordingly, as shown by reference number 138, the schema management system may modify the supergraph schema (e.g., based on the selection information). For example, the schema management system may modify the supergraph schema to include only the portion of the super-graph schema that includes the one or more particular portions of the particular subgraph schema that include the one or more particular portions of the unit schema. That is, the supergraph schema may be modified to only include only selected portions (e.g., that are indicated by the selection information). In this way, the supergraph schema may be modified to include only portions (i.e., "cherry-picked" portions) of the supergraph schema, the particular subgraph schema, and the unit schema.

As shown by reference number 140, the schema management system then may provide the modified supergraph schema (e.g., after validating and/or approving the modified supergraph schema) to the at least one particular network device (e.g., for deployment in the particular environment), such as a similar manner as that described herein in relation to FIGS. 1F-1H.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
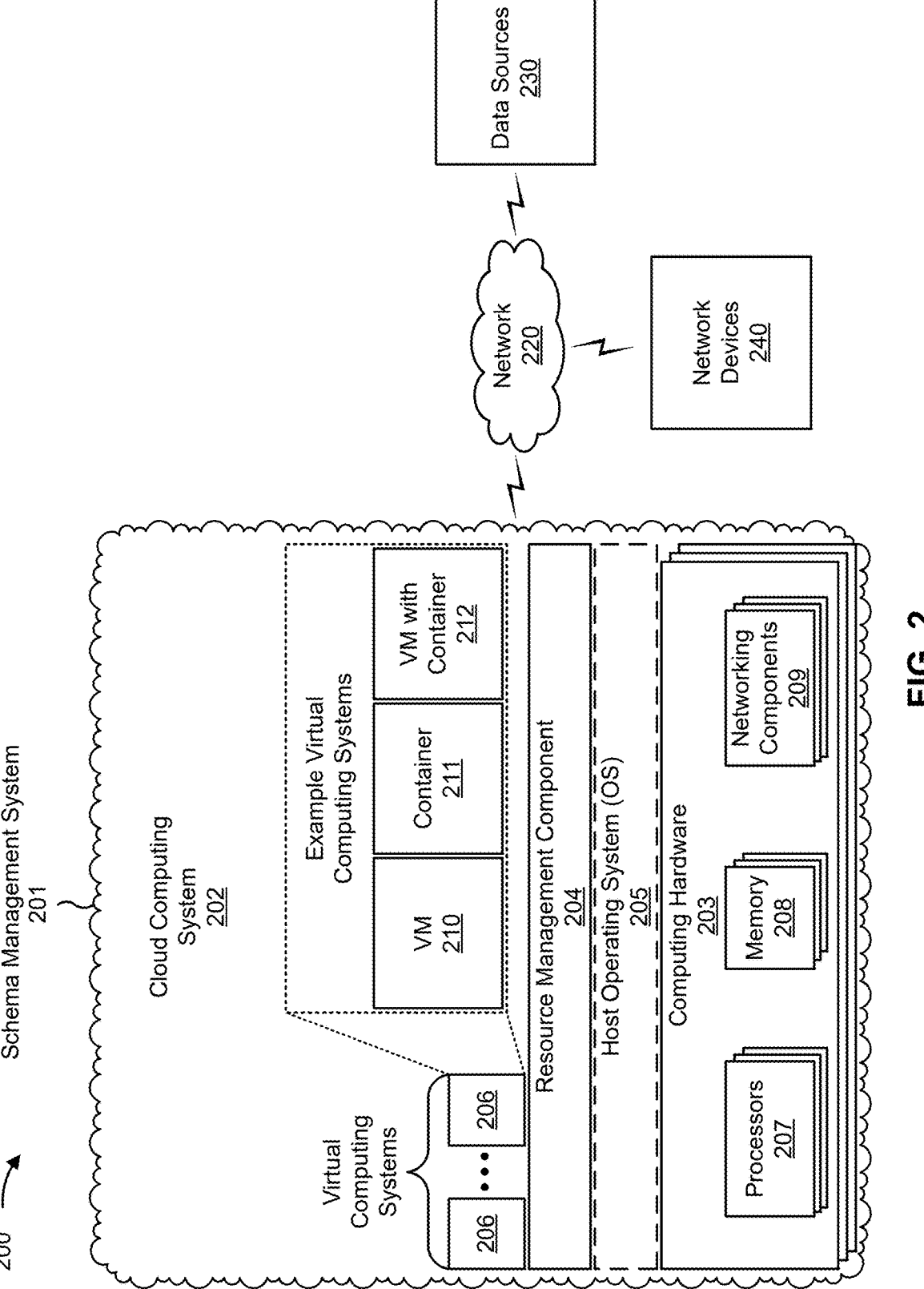
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a schema management system 201, which may include one or more elements of and/or may execute within a cloud computing system 202. The cloud computing system 202 may include one or more elements 203-212, as described in more detail below. As further shown in FIG. 2, environment 200 may include a network 220, data sources 230, and/or network devices 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the schema management system 201 may include one or more elements 203-212 of the cloud computing system 202, may execute within the cloud computing system 202, and/or may be hosted within the cloud computing system 202, in some implementations, the schema management system 201 may not be cloud-based (e.g., may be implemented outside of a cloud computing system) or may be partially cloud-based. For example, the schema management system 201 may include one or more devices that are not part of the cloud computing system 202, such as device 300 of FIG. 3, which may include a standalone server or another type of computing device. The schema management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The data source 230 may include one or more devices capable of receiving, generating, storing, processing, and/or providing information described elsewhere herein. The data source 230 may include a communication device and/or a computing device. For example, the data source 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 230 may communicate with one or more other devices of environment 200, as described elsewhere herein. The data source 230 may store unit information and/or one or more schemas (e.g., a unit schema, a subgraph schema, and/or a supergraph schema), as described elsewhere herein.

The network device 240 may include one or more devices capable of receiving, processing, storing, routing, and/or providing traffic (e.g., a packet and/or other information) in a manner described herein. For example, the network device 240 may include a router, such as a label switching router (LSR), a label edge router (LER), an ingress router, an egress router, a provider router (e.g., a provider edge router or a provider core router), a virtual router, or another type of router. Additionally, or alternatively, the network device 240 may include a gateway, a switch, a firewall, a hub, a bridge, a reverse proxy, a server (e.g., a proxy server, a cloud server, or a data center server), a load balancer, and/or a similar device. In some implementations, the network device 240 may be a physical device implemented within a housing, such as a chassis. In some implementations, the network device 240 may be a virtual device implemented by one or more computing devices of a cloud computing environment or a data center. In some implementations, a group of network devices 240 may be a group of data center nodes that are used to route traffic flow through a network. The network device 240 may be associated with an environment, such as a review environment, a staging environment, or a production environment, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
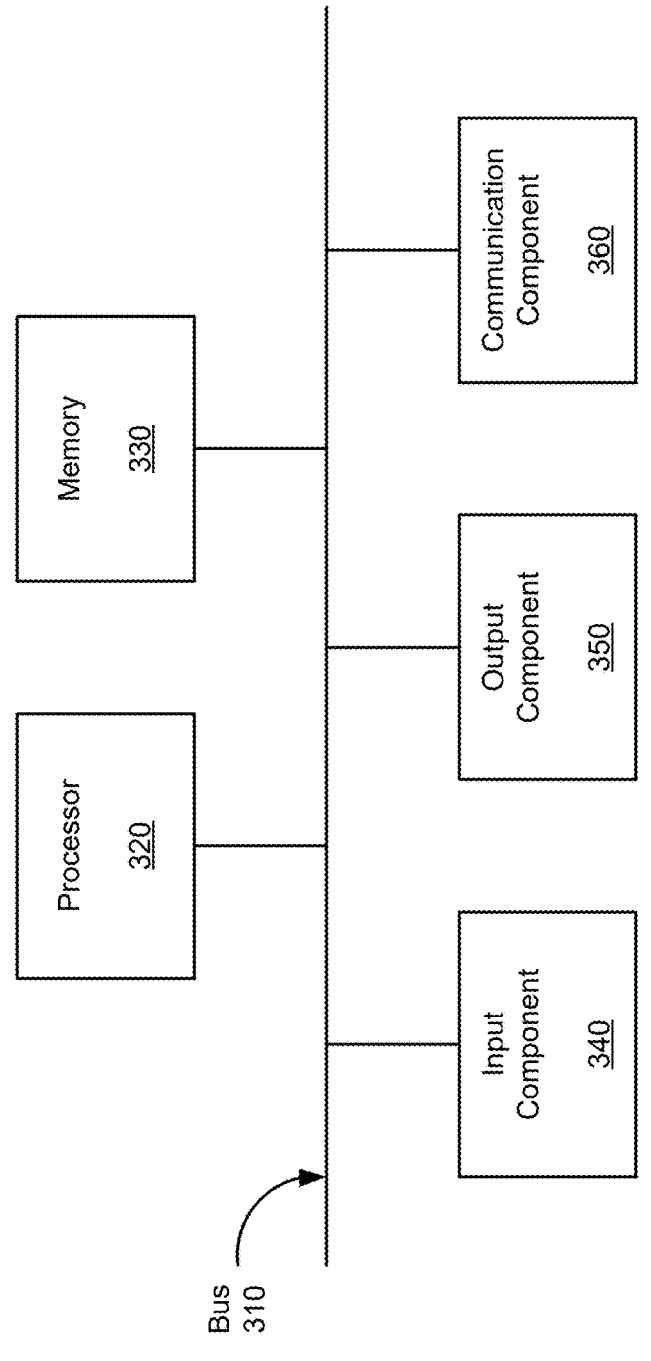
FIG. 3 is a diagram of example components of a device associated with schema management for a federated graph with at least three layers, in accordance with some embodiments of the present disclosure.

FIG. 3 is a diagram of example components of a device 300 associated with schema management for a federated graph with at least three layers. The device 300 may correspond to the schema management system 201, the computing hardware 203, the data source 230, and/or the network device 240. In some implementations, the schema management system 201, the computing hardware 203, the data source 230, and/or the network device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
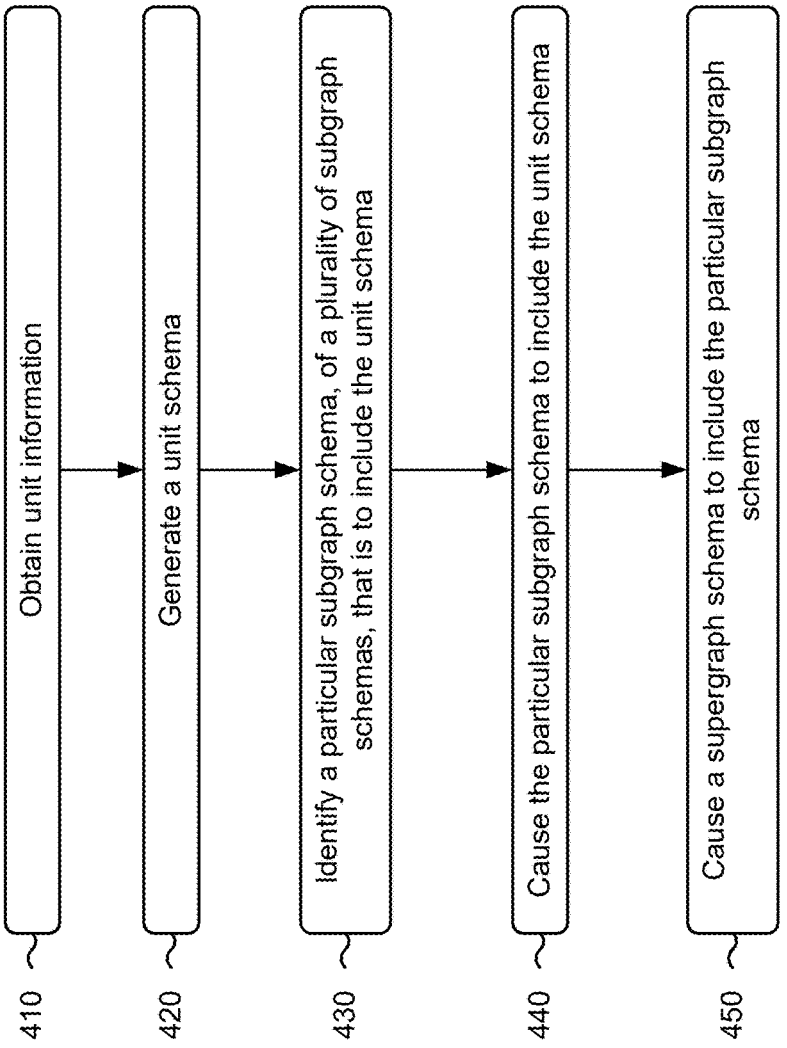
FIG. 4 is a flowchart of an example process associated with schema management for a federated graph with at least three layers, in accordance with some embodiments of the present disclosure.

FIG. 4 is a flowchart of an example process 400 associated with schema management for a federated graph with at least three layers. In some implementations, one or more process blocks of FIG. 4 may be performed by the schema management system 201. In some implementations, one or more process blocks of FIG. 4 may be performed by another device or a group of devices separate from or including the system, such as the computing hardware 203, the data source 230, and/or the network device 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining unit information (block 410). For example, the schema management system 201 (e.g., using processor 320, memory 330, input component 340, output component 350, and/or communication component 360) may obtain unit information, as described above in connection with reference number 102 of FIG. 1A. As an example, the schema management system 201 may send a request for the unit information to a first data source, and the first data source, in response, may send the unit information to the schema management system 201.

As further shown in FIG. 4, process 400 may include generating, based on the unit information, a unit schema (block 420). For example, the schema management system 201 (e.g., using processor 320 and/or memory 330) may generate, based on the unit information, a unit schema, as described above in connection with reference number 104 of FIG. 1A. As an example, the schema management system 201 may process the unit information (e.g., using an information-to-schema processing technique) to generate the unit schema.

As further shown in FIG. 4, process 400 may include identifying a particular subgraph schema, of a plurality of subgraph schemas, that is to include the unit schema (block 430). For example, the schema management system 201 (e.g., using processor 320 and/or memory 330) may identify, based on generating the unit schema, a particular subgraph schema, of a plurality of subgraph schemas, that is to include the unit schema, as described above in connection with reference number 106 of FIG. 1B. As an example, the schema management system 201 may identify one or more parameters associated with the unit schema and may thereby identify, based on the one or more parameters, the particular subgraph schema.

As further shown in FIG. 4, process 400 may include causing the particular subgraph schema to include the unit schema (block 440). For example, the schema management system 201 (e.g., using processor 320 and/or memory 330) may cause the particular subgraph schema to include the unit schema, as described above in connection with reference number 112 of FIG. 1C. As an example, the schema management system 201 may merge (e.g., using a federated graph merging technique) the unit schema with the particular subgraph schema.

As further shown in FIG. 4, process 400 may include causing a supergraph schema to include the particular subgraph schema (block 450). For example, the schema management system 201 (e.g., using processor 320 and/or memory 330) may cause, based on causing the particular subgraph schema to include the unit schema, a supergraph schema to include the particular subgraph schema, as described above in connection with reference number 120 of FIG. 1E. As an example, the schema management system 201 may merge (e.g., using a federated graph merging technique) the particular subgraph schema with the supergraph schema.

In some implementations, process 400 may include enabling selection of particular portions of the unit schema, the particular subgraph schema, and the supergraph schema; modifying, based on enabling selection of the particular portions of the unit schema, the particular subgraph schema, and the supergraph schema; and providing the supergraph schema to at least one particular network device associated with a particular environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1H. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for schema management of a federated graph with at least three levels, the system comprising:
   one or more memories; and
   one or more processors, communicatively coupled to the one or more memories, configured to:
      obtain unit information;

16 generate, based on the unit information, a unit schema associated with a third level of the federated graph;
identify, based on generating the unit schema, a particular subgraph schema, of a plurality of subgraph schemas associated with a second level of the federated graph, that is to include the unit schema;
cause the particular subgraph schema to include the unit schema; and
cause, based on causing the particular subgraph schema to include the unit schema, a supergraph schema associated with a first level of the federated graph to include the particular subgraph schema.

2. The system of claim 1,
wherein the one or more processors, to identify the particular subgraph schema, are configured to:
   identify one or more parameters associated with the unit schema; and
   identify, based on the one or more parameters, the particular subgraph schema.

3. The system of claim 1,
wherein the one or more processors, to cause the particular subgraph schema to include the unit schema, are configured to:
   determine, using at least one approval technique, that the unit schema is approved to be included in the particular subgraph schema; and
   merge, based on determining that the unit schema is approved to be included in the particular subgraph schema, the unit schema with the particular subgraph schema.

4. The system of claim 1,
wherein the one or more processors, to cause the supergraph schema to include the particular subgraph schema, are configured to:
   determine, using at least one approval technique, that the particular subgraph schema is approved to be merged with the supergraph schema; and
   merge, based on determining that the particular subgraph schema is approved to be merged with the supergraph schema, the particular subgraph schema with the supergraph schema.

5. The system of claim 1,
wherein the one or more processors are further configured to:
   provide, based on causing the supergraph schema to include the particular subgraph schema, the supergraph schema to at least one network device associated with a review environment.

6. The system of claim 1,
wherein the one or more processors are further configured to:
   cause, based on causing the supergraph schema to include the particular subgraph schema, the supergraph schema to be validated for a staging environment;
   determine, using at least one first approval technique and based on causing the supergraph schema to be validated for the staging environment, that the supergraph schema is approved for the staging environment; and
   provide, based on determining that the supergraph schema is approved for the staging environment, the supergraph schema to at least one network device associated with the staging environment.

7. The system of claim 6,
wherein the one or more processors are further configured to:

cause, based on providing the supergraph schema to the at least one network device associated with the staging environment, the supergraph schema to be validated for a production environment;

determine, using at least one second approval technique and based on causing the supergraph schema to be validated for the production environment, that the supergraph schema is approved for the production environment; and provide, based on determining that the supergraph schema is approved for the production environment, the supergraph schema to at least one other network device associated with the production environment.

8. The system of claim 1,
wherein the one or more processors are further configured to:

enable selection of particular portions of the unit schema, the particular subgraph schema, and the supergraph schema;

modify, based on enabling selection of the particular portions of the unit schema, the particular subgraph schema, and the supergraph schema; and provide the supergraph schema to at least one particular network device associated with a particular environment.

9. A non-transitory computer-readable medium storing a set of instructions, the set of instructions comprising:

one or more instructions that, when executed by one or more processors of a system for schema management of a federated graph with at least three levels, cause the system to:

generate, based on unit information, a unit schema associated with a third level of the federated graph;

cause a particular subgraph schema, of a plurality of subgraph schemas associated with a second level of the federated graph, to include the unit schema;

cause, based on causing the particular subgraph schema to include the unit schema, a supergraph schema associated with a first level of the federated graph to include the particular subgraph schema; and provide, based on causing the supergraph schema to include the particular subgraph schema, the supergraph schema to at least one network device.

10. The non-transitory computer-readable medium of claim 9,
wherein the one or more processors, to cause the particular subgraph schema to include the unit schema, are configured to:

determine that the unit schema is approved to be included in the particular subgraph schema; and merge, based on determining that the unit schema is approved to be included in the particular subgraph schema, the unit schema with the particular subgraph schema.

11. The non-transitory computer-readable medium of claim 9,
wherein the one or more processors, to cause the supergraph schema to include the particular subgraph schema, are configured to:

determine that the particular subgraph schema is approved to be merged with the supergraph schema; and merge, based on determining that the particular subgraph schema is approved to be merged with the supergraph schema, the particular subgraph schema with the supergraph schema.

12. The non-transitory computer-readable medium of claim 9,
wherein the at least one network device is associated with a review environment.

13. The non-transitory computer-readable medium of claim 9,
wherein the one or more processors, to provide the supergraph schema to the at least one network device, are configured to:

determine, based on causing the supergraph schema to include the particular subgraph schema, that the supergraph schema is approved for a staging environment; and provide, based on determining that the supergraph schema is approved for the staging environment, the supergraph schema to the at least one network device, wherein the at least one network device is associated with the staging environment.

14. The non-transitory computer-readable medium of claim 13,
wherein the one or more processors, to provide the supergraph schema to the at least one network device, are configured to:

determine, based on causing the supergraph schema to include the particular subgraph schema, that the supergraph schema is approved for a production environment; and provide, based on determining that the supergraph schema is approved for the production environment, the supergraph schema to the at least one network device, wherein the at least one network device is associated with the production environment.

15. A method, comprising:
obtaining, by a system for schema management of a federated graph with at least three levels, unit information;

generating, by the system, a unit schema associated with a third level of the federated graph;

causing, by the system, a particular subgraph schema, of a plurality of subgraph schemas associated with a second level of the federated graph, to include the unit schema; and causing, by the system, a supergraph schema associated with a first level of the federated graph to include the particular subgraph schema.

16. The method of claim 15,
wherein causing the particular subgraph schema to include the unit schema comprises:

merging, based on determining that the unit schema is approved to be included in the particular subgraph schema, the unit schema with the particular subgraph schema.

17. The method of claim 15,
wherein causing the supergraph schema to include the particular subgraph schema comprises:

merging, based on determining that the particular subgraph schema is approved to be merged with the supergraph schema, the particular subgraph schema with the supergraph schema.

18. The method of claim 15, further comprising:
providing the supergraph schema to at least one network device associated with a review environment.

19. The method of claim 15, further comprising:
providing, based on determining that the supergraph schema is approved for a staging environment, the supergraph schema to at least one network device associated with the staging environment.

20. The method of claim 15, further comprising:

providing, based on determining that the supergraph schema is approved for a production environment, the supergraph schema to at least one other network device associated with the production environment.

\*   \*   \*   \*   \*